March 14, 1950  A. C. FULTON  2,500,352
PROCESS OF TREATING RUBBER
Filed Feb. 21, 1948  2 Sheets-Sheet 2
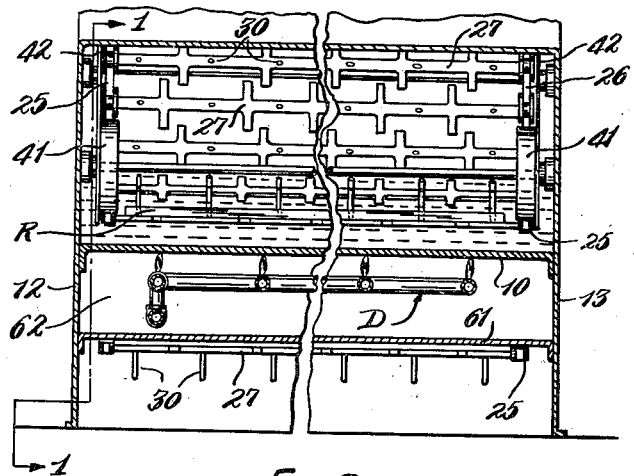
FIG. 2
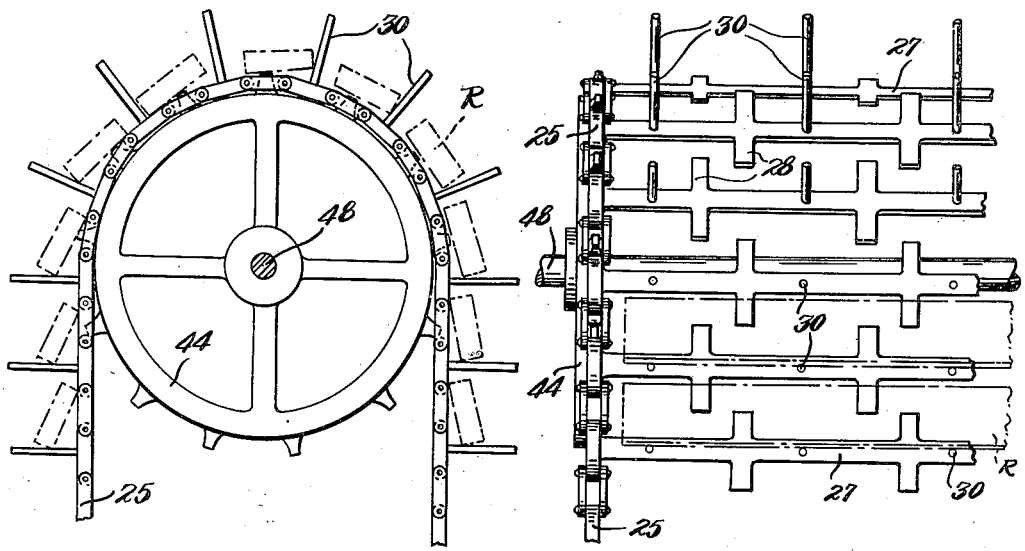
FIG. 3  FIG. 4
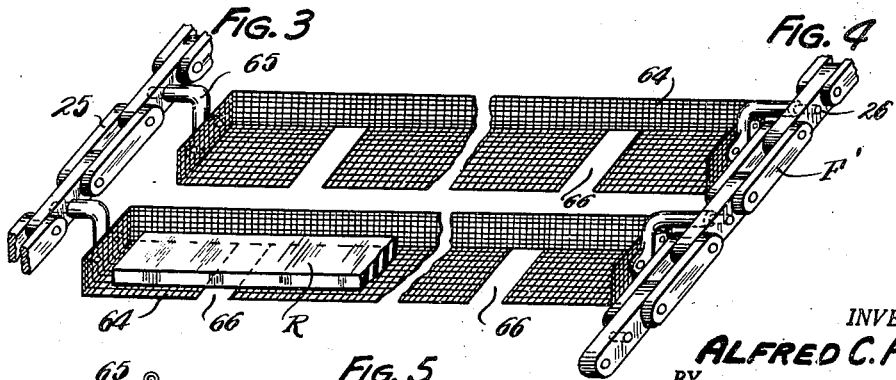
FIG. 5
FIG. 6
INVENTOR.
ALFRED C. FULTON
BY
Kwis, Hudson, Boughton & Williams
ATTORNEYS Patented Mar. 14, 1950

2,500,352

UNITED STATES PATENT OFFICE 2,500,352

PROCESS OF TREATING RUBBER

Alfred C. Fulton, Ashtabula, Ohio, assignor to The Dunne Rubber Company, Ashtabula, Ohio, a corporation of Ohio Application February 21, 1948, Serial No. 10,143

3 Claims. (Cl. 18—48)

The present invention relates to the manufacture of rubber or rubber-like articles and, more particularly, to the manufacture of such articles by extrusion.

In the manufactue of extruded rubber articles, compounded but unvulcanized rubber stock is forced through extruding dies while heated to a temperature which makes it plastic or more plastic than it is at room temperature. Before the rubber stock is fed to the extruding machine, it is usually heated on a rubber mill, commonly referred to in the art as a "warm-up" mill. Attempts have been made to heat the rubber stock from room temperature to extruding temperature in the extruding machine but such machines have not been wholly satisfactory and have met with only limited commercial success. These methods of heating the rubber stock prior to its being forced through the extruding dies are not entirely satisfactory. One of the principal difficulties has been the impossibility of heating the rubber stock uniformly to a desired predetermined temperature, a prerequisite to the production of uniform articles or material since variations in the temperature of the rubber stock being extruded produces variations in the size of the article or material leaving the extruding dies. In addition to not heating the rubber stock uniformly, the warm-up mill breaks the fibers of the material and produces non-uniform, internal strains therein which cause further variations in the size of the article extruded.

Other disadvantages of the use of a warm-up mill is the necessity of locating the mill near the extruding machine or vice versa. It is seldom convenient to locate the extruding machine in the compounding room and if the warm-up mill is not located adjacent to the compounding room, it cannot be used for compounding purposes when not being used as a warm-up mill. The mills are quite heavy and difficult to move from one location to another and because they are expensive, it is not economical to permit them to stand idle for any considerable period of time. Many manufacturers of extruded rubber articles buy or could buy compounded rubber stock and would, therefore, not need a rubber mill if the rubber stock could be otherwise preheated satisfactorily prior to being fed to the extruding machine.

With the foregoing in mind, one of the principal objects of the present invention is the provision of a novel and improved method of heating rubber and like stock preparatory to its extrusion, which method will be simple and inexpensive to practice and will not necessitate the use of a rubber mill.

Another object of the invention is the provision of a novel and improved method of heating rubber and like stock preparatory to its being extruded, which includes subjecting the rubber stock to a heated fluid, preferably liquid and more particularly water.

Another object of the invention is the provision of a novel and improved process of manufacturing extruded rubber articles which comprises heating the rubber stock to a predetermined uniform temperature by subjecting it to a heated fluid and subsequently forcing it through extruding dies while hot.

The invention resides in certain novel process steps and further objects and advantages will be apparent to those skilled in the art to which it relates from the following description of the preferred process and apparatus for practicing the process described with reference to the accompanying drawings forming a part of this specification, in which:

Fig. 2 is a sectional view of the machine shown in Fig. 1 taken approximately on the line 2—2 of Fig. 1;

Figs. 3 and 4 are fragmentary detail views of parts of the machine;

Fig. 5 is a fragmentary perspective view of a modified form of conveyor; and

Fig. 6 is an end view of one of the trays shown in Fig. 5.

Figure 1:
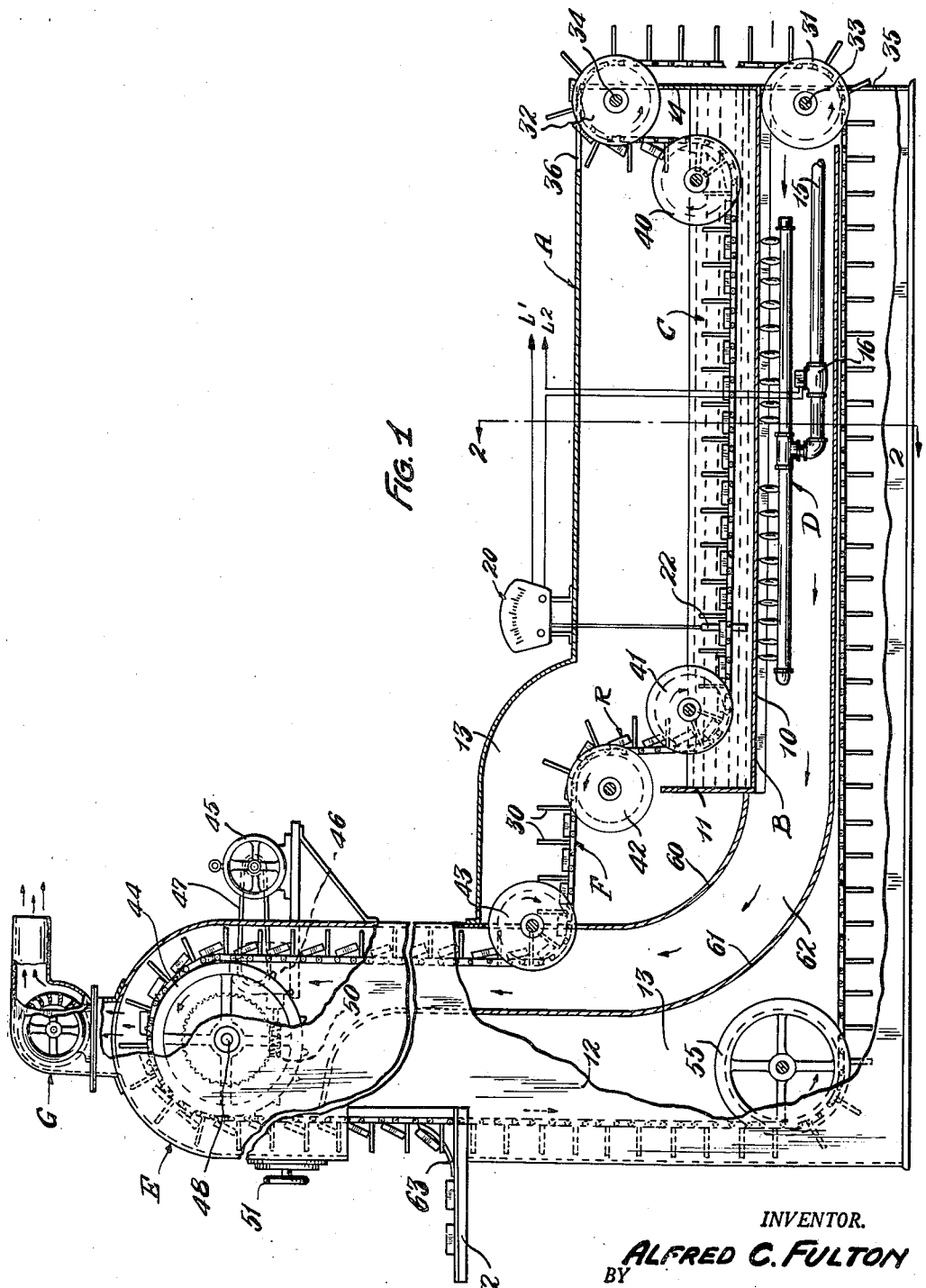
Fig. 1 is a side elevational view, with portions broken away and in section, approximately on the line 1—1 of Fig. 2 of a machine constructed and operable in accordance with the present invention.

Generally speaking, the process of the present invention comprises producing extruded rubber or like articles by heating compounded rubber stock to a uniformly predetermined temperature by subjecting the stock to a heated fluid and then forcing or passing the stock through extruding dies while hot. The fluid medium is preferably water and the rubber stock is dried without material loss of heat before passing to the extruding dies because any water remaining in the material as it goes through the extruding dies would produce holes and voids in the finished article.

Rubber stock of the character used usually comes from the rubber or compounding mills in the form of sheets, the size and thickness of which depend upon the size of the mill, etc. In prior art methods, the compounded stock is subsequently heated or warmed up on a similar mill called a "warm-up" mill preparatory to extruding. The material is usually taken off the warm-up mill in similar sheet form. Because conventional extruding machines are designed to have a limited amount of stock fed thereto more or less continuously, the sheets are cut into strips, the size of which depends upon the design of the extruding machine and the size, that is, the cross-sectional area, of the product being extruded.

According to the provisions of the present invention, the warm-up mill is eliminated and the sheets of compounded rubber stock which come from the compounding mill are cut into strips of the desired width, heated in a fluid, preferably a liquid; such as, water, dried if necessary, and while still hot fed to the extruding machine. The process may be carried out manually, automatically or semi-automatically. If performed manually, the only equipment required, in addition to a conventional extruding machine, is a hot air chamber or a heated bath and a drying means, such as, a hot table or plate. Equipment of this character is inexpensive and can be located near the extruding machine.

Referring to the drawings, the machine shown is designed for heating strips of rubber stock R about ½" thick, 4" wide, and any convenient length; for example, from about 4' to 8', which strips are subsequently fed by hand to a conventional extruding machine. Generally speaking, the machine comprises a horizontal, box-like housing A enclosing a tank B containing a liquid, preferably water, designated C, and means such as the gas burner D for heating the liquid. The housing A has an opening in the top at one end communicating with the lower end of a drying tower E. The machine also includes a continuous conveyor F for carrying the strips of rubber stock R successively through the water C in the tank B and the drying tower E where any water carried along by the conveyor F and the rubber stock R is dried, and means for removing or discharging the rubber stock from the conveyor or machine at an unloading station at the front of the machine.

As shown, the housing A and tower E are formed of steel plates or sheets welded together and the tank B is formed by horizontal and vertical partitions 10, 11 extending from one side of the machine to the other and welded to each other, the right and left-hand side plates or members 12, 13 and the rear plate member 14. The liquid in the tank B may be heated in any convenient manner. A gas burner is preferred as it permits accurate control of the temperature of the aqueous bath C and the hot gases resulting from the combustion of the gas can be utilized to dry the rubber stock and help control the temperature of the rubber stock delivered at the unloading station at the front of the machine.

The burner D shown is of conventional construction and the supply line 15 thereto is equipped with a solenoid controlled valve 16 connected in series circuit with a power source L1, L2 and a thermostat controlled meter 20 having a normally closed switch adapted to be opened when the temperature of the bath C reaches a predetermined desired temperature. The meter 20 is of commercial construction and is not shown in detail. Suffice it to say that the operating unit 22 is immersed in the bath C. A pointer in the meter 20 gives a visual indication of the temperature of the bath C at all times.

The endless conveyor F, as shown, comprises two spaced sprocket chains 25, 26, alternate links of which are connected together by flat members or bars 27 which extend from one chain or the other. Projections 28 on adjacent sides of adjoining bars overlap each other so as to support the rubber strips R while permitting the conveyor to flex about the wheels which support and guide it. For the purpose of supporting the rubber strips R as they are carried along the vertical reaches of the conveyor, the bars or members 27 are provided with spaced pins 30 which normally project in a direction at right angles to the path of travel of the conveyor at any particular instance. A short vertical reach of the conveyor F extending between pairs of guide wheels 31, 32 is located outside of the housing A and permits the conveyor to be loaded either manually or automatically. The guide wheels 31, 32 are located below the tank B and adjacent to the upper rear end of the housing A, respectively, and are supported by transversely extending shafts 33, 34, respectively, suitably journaled in the side plates or members 12, 13 of the housing. Suitable openings 35, 36 in the housing A permit the guide wheels and the conveyor to project from the housing. From the guide wheels 32 the conveyor travels in a vertically downward direction into the rear end of the tank B where it passes about a pair of guide wheels 40. As the conveyor F passes about the guide wheels 32 and continues to the guide wheels 40 it carries the rubber strips R into the interior of the housing A. The guide wheels 40 are carried by a transversely extending shaft suitably journaled in the side members 12, 13 of the housing A as are the various other guide wheels which support the endless conveyor F and are hereinafter referred to.

As the conveyor approaches the left-hand or discharge end of the tank B after having traveled through the liquid C, it passes underneath a pair of guide wheels 41 and then after traveling for a short distance in a vertical direction, it passes over a pair of guide wheels 42 which guide it to a pair of guide wheels 43 at the lower right-hand end of the cooling tower E. Between the pairs of guide wheels 42, 43 the conveyor travels in a generally horizontal direction. From the guide wheels 43 the conveyor travels in a vertical direction to a point adjacent to the top of the drying tower E where it passes over a pair of large sprocket wheels 44, both of which are driven by an electric motor 45 through a variable speed drive unit 46. As shown, the electric motor is connected to the variable speed drive unit 46 by a belt 47 and the variable speed unit is connected to the shaft 48 which carries the sprocket wheels 44 by a worm and worm wheel drive, designated generally by the reference character 50.

The control for the variable speed drive 46, which control is designated by the reference character 51, is located at the front of the machine adjacent to the place where the endless conveyor F discharges the rubber strips onto a table or shelf 52 so that the speed of the conveyor can be readily controlled by the operator. The variable speed unit 46 and its control 51 are not herein shown and described in detail as devices of this character are well known and are commercially available. As an alternative construction, it will be apparent that a variable speed motor may be employed and the variable speed drive unit 46 omitted, in which event the motor can be controlled from the front of the machine in a manner similar to that in which the variable speed unit is controlled.

From the sprocket wheels 44 the endless conveyor extends downwardly in a vertical direction to a pair of guide wheels 55 at the lower front end of the machine, from which guide wheels it continues in a generally horizontal direction to the pair of guide wheels 41 at the rear of the machine. All of the various guide wheels referred to comprise external flanges which prevent or limit movement of the endless conveyor F longitudinally of the axis of rotation of the guide wheels. Alternatively sprocket wheels could be substituted for the guide wheels and, if desired, one or more pairs may be driven.

The interior of the machine is preferably provided with two partitions 60, 61 comprising plates extending from one side of the machine to the other and welded to the side plates or members 12, 13. The partitions, together with the bottom plate 10 of the tank B and other parts of the machine, form a duct 62 within which the gas burner D is located and which directs the hot gases of combustion to that part of the conveyor F which is traveling in an upwardly vertical direction between the wheels 33, 34 and within the drying tower E. The hot gases dry any water adhering to the conveyor or rubber strips R so that the strips will be perfectly dry when they are discharged from the machine. Air for supporting combustion is admitted to the duct 62 through the opening 35 at the right-hand or rear end of the machine, which is the opening through which the conveyor F travels to the outside of the housing proper so that it can be loaded. If the natural draft is not sufficient to cause the required flow of air through the duct 62, the draft can be increased by the provision of a motor-driven blower G at the top of the drying tower E. If desired, the blower may be provided with a variable speed drive so that the amount of air drawn through the duct can be controlled. In the machine shown, the rubber strips R are automatically discharged upon the table or shelf 52 by a plurality of spaced members 63 carried by the shelf 52 and inclined rearwardly and upwardly with respect to the direction of travel of the conveyor F.

If desired, the conveyor F can be arranged so that it can be loaded at the front of the machine by the operator located there, either through the opening immediately above the shelf or table 52, in which event the members 63 would be omitted or raised high enough to permit loading underneath them, or through a separate opening underneath the table 52. A conveyor which can be loaded at either the front or rear of the machine is illustrated in Figs. 5 and 6 and designated by the reference character F'. The conveyor F' is similar in construction to the conveyor F previously described except for the work supporting members carried by the links of the sprocket chains 25', 26', similar to the sprocket chains 25, 26 of conveyor F. In this instance the transversely extending members 27 of the conveyor F are replaced by basket or tray-like members 64 made of foraminous material so that the liquid C in the tank B and the heated gases in the duct 62 can come in intimate contact with the rubber strips R. The trays proper are pivotally connected to alternate links of the sprocket chains by angular members 65 riveted or otherwise secured thereto and pivotally connected to the sprocket chains. As shown, the outer ends of the members 65 are cylindrical and are rotatably supported within suitable apertures in the links of the sprocket chains. In the event the members 63 are employed to unload the conveyor at the front end of the machine, the bottoms of the trays 64 are provided with apertures 66 to allow the members 63 to pass therethrough.

The bath C is preferably maintained at a temperature of approximately 160° F. to 180° F.; however, the temperature to which the rubber stock is heated preparatory to extruding will depend upon conditions well understood in the art, such as composition of the particular material being extruded at any time. Some rubber stocks can be extruded satisfactorily at temperatures approximating room temperatures while others require relatively high temperatures. The temperature to which the stock is heated, however, must be less than that at which the material will cure or vulcanize. The optimum temperature is one which will impart to the rubber stock sufficient softness and pliability to extrude satisfactorily. A uniform temperature throughout the stock is important because variations in the temperature of the stock being extruded produces variations in the size of the article being extruded. Attention is also called to the fact that the present method of "warming-up" the rubber stock does not produce non-uniform, internal strains as does a "warm-up" mill which tears and pulls the rubber stock non-uniformly.

From the foregoing description of the preferred embodiment of the invention, it is believed that it will be apparent that the objects heretofore enumerated and others have been accomplished and that there has been provided a novel and improved method of manufacturing extruded rubber and like articles which does not employ a warm-up mill. While preferred embodiments of the invention have been described in considerable detail as applied to the manufacture of extruded rubber and rubber-like articles, the invention is not limited to extruded articles but is applicable to molding and other fabricating processes and to plastic materials generally, and it is my intention to cover hereby all adaptations, modifications and uses thereof which come within the practice of those skilled in the art to which the invention relates and within the scope of the appended claims.

Having thus described my invention, I claim:

1. The process of manufacturing extruded rubber articles which comprises immersing rubber stock in a heated liquid bath until the stock is heated to a predetermined temperature, drying the rubber stock without material loss of heat and subsequently forcing it while heated through extruding dies.

2. The process of manufacturing extruded rubber articles which comprises immersing rubber stock in hot water until the stock is heated to a predetermined temperature, drying the rubber stock without material loss of heat and subsequently forcing it while hot through extruding dies.

3. The process of manufacturing extruded rubber articles which comprises immersing rubber stock in a heated liquid bath, drying the rubber stock without material loss of heat and subsequently feeding it while hot to an extruding machine.

ALFRED C. FULTON.

REFERENCES CITED

The following references are of record in the file of this patent:

UNITED STATES PATENTS

| Number | Name | Date |
| --- | --- | --- |
| 1,728,471 | Bratring | Sept. 17, 1929 |
| 2,216,188 | Dons et al. | Oct. 1, 1940 |
| 2,439,367 | Middlestadt | Apr. 6, 1948 |